United States Patent
Kim et al.

(10) Patent No.: US 9,313,725 B2
(45) Date of Patent: Apr. 12, 2016

(54) METHOD FOR PERFORMING AUTONOMOUSLY SEARCH FOR A CELL AND A DEVICE THEREFOR

(71) Applicant: LG ELECTRONICS INC., Seoul (KR)

(72) Inventors: Sangwon Kim, Seoul (KR); Jaewook Lee, Seoul (KR); Youngdae Lee, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 75 days.

(21) Appl. No.: 14/229,669

(22) Filed: Mar. 28, 2014

(65) Prior Publication Data
US 2014/0302845 A1    Oct. 9, 2014

Related U.S. Application Data

(60) Provisional application No. 61/809,217, filed on Apr. 5, 2013.

(51) Int. Cl.
*H04W 48/16* (2009.01)
*H04W 24/10* (2009.01)
*H04W 64/00* (2009.01)
*H04W 84/04* (2009.01)

(52) U.S. Cl.
CPC .............. *H04W 48/16* (2013.01); *H04W 24/10* (2013.01); *H04W 84/045* (2013.01)

(58) Field of Classification Search
CPC ..... H04W 24/10; H04W 48/16; H04W 64/00; H04W 84/045
See application file for complete search history.

(56) References Cited

U.S. PATENT DOCUMENTS

2013/0040640 A1* 2/2013 Chen et al. ................... 455/434

* cited by examiner

*Primary Examiner* — Kashif Siddiqui
(74) *Attorney, Agent, or Firm* — Birch, Stewart, Kolasch & Birch, LLP

(57) ABSTRACT

The present invention relates to a wireless communication system. More specifically, the present invention relates to a method and a device for performing autonomously search for a cell in the wireless communication system, the method comprising: receiving configuration information including frequency information; autonomously performing search for a cell in accordance with the frequency information; and transmitting a proximity indication about a detected cell when the cell is detected on a frequency identified by the frequency information.

10 Claims, 8 Drawing Sheets

E-UMTS (a) contol - plane protocol stack (b) user - plane protocol stack

METHOD FOR PERFORMING AUTONOMOUSLY SEARCH FOR A CELL AND A DEVICE THEREFOR

CROSS REFERENCE TO RELATED APPLICATIONS

This nonprovisional application claims the benefit of U.S. Provisional Application No. 61/809,217 filed on Apr. 5, 2013. The entire contents of the above application is hereby incorporated by reference.

TECHNICAL FIELD

The present invention relates to a wireless communication system and, more particularly, to a method for performing autonomously search for a cell and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for performing autonomously search for a cell in a wireless communication system. The technical problems solved by the present invention are not limited to the above technical problems and those skilled in the art may understand other technical problems from the following description.

Technical Solution

The object of the present invention can be achieved by providing a method for operating by an user equipment (UE) in wireless communication system, the method comprising; receiving configuration information including frequency information; autonomously performing search for a cell in accordance with the frequency information; and transmitting a proximity indication about a detected cell when the cell is detected on a frequency identified by the frequency information.

In another aspect of the present invention, provided herein is a UE (User Equipment) in the wireless communication system, the UE comprising: an RF (Radio Frequency) module; and a processor to control the RF module, wherein the processor configures to receive configuration information including frequency information, to autonomously perform search for a cell in accordance with the frequency information, and to transmit a proximity indication about a detected cell when the cell is detected on a frequency identified by the frequency information.

Preferably, the proximity indication reports the cell in proximity without measured result.

Preferably, the proximity indicator is transmitted only if the configuration information is received.

Preferably, the frequency information comprises one or more carrier frequency for the search.

Preferably, the frequency information further comprises PCI (Physical Cell ID) of corresponding cells.

Preferably, the method further comprises receiving command for measurement for the detected cell indicated by the proximity indication, performing the measurement for the detected cell, and transmitting a measurement report including a result of the measurement.

Advantageous Effects

According to the present invention, autonomously search for a cell can be efficiently performed in a wireless communication system. Specifically, a measurement procedure can be efficiently performed in small cell measurement.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
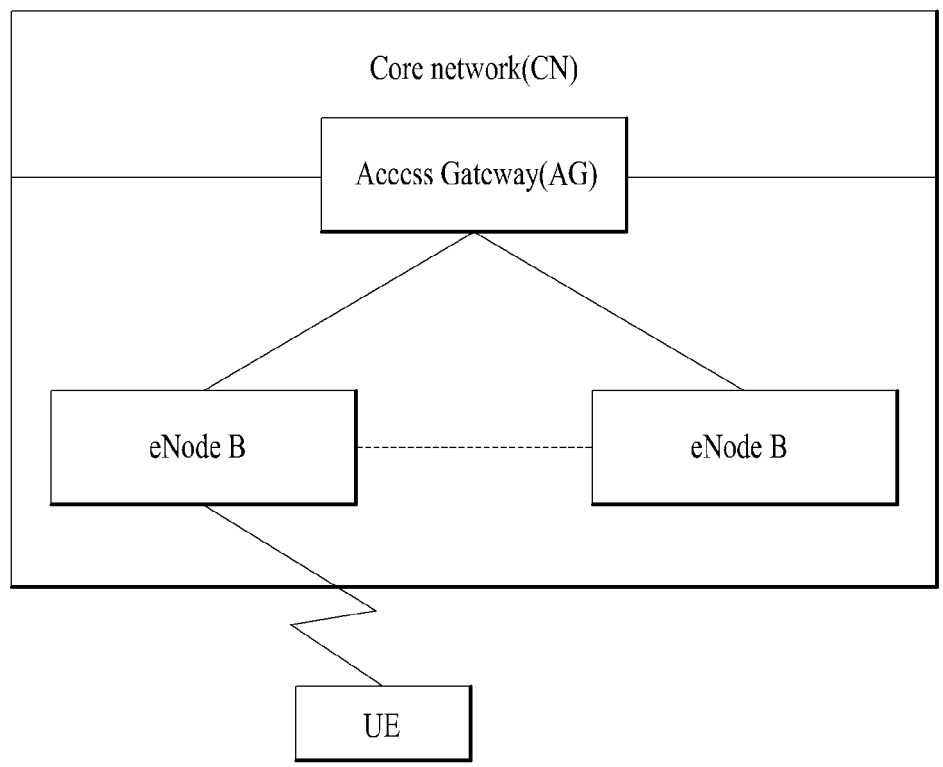
FIG. 1 is a diagram showing a network structure of an Evolved Universal Mobile Telecommunications System (E-UMTS) as an example of a wireless communication system.
Figure 2A:
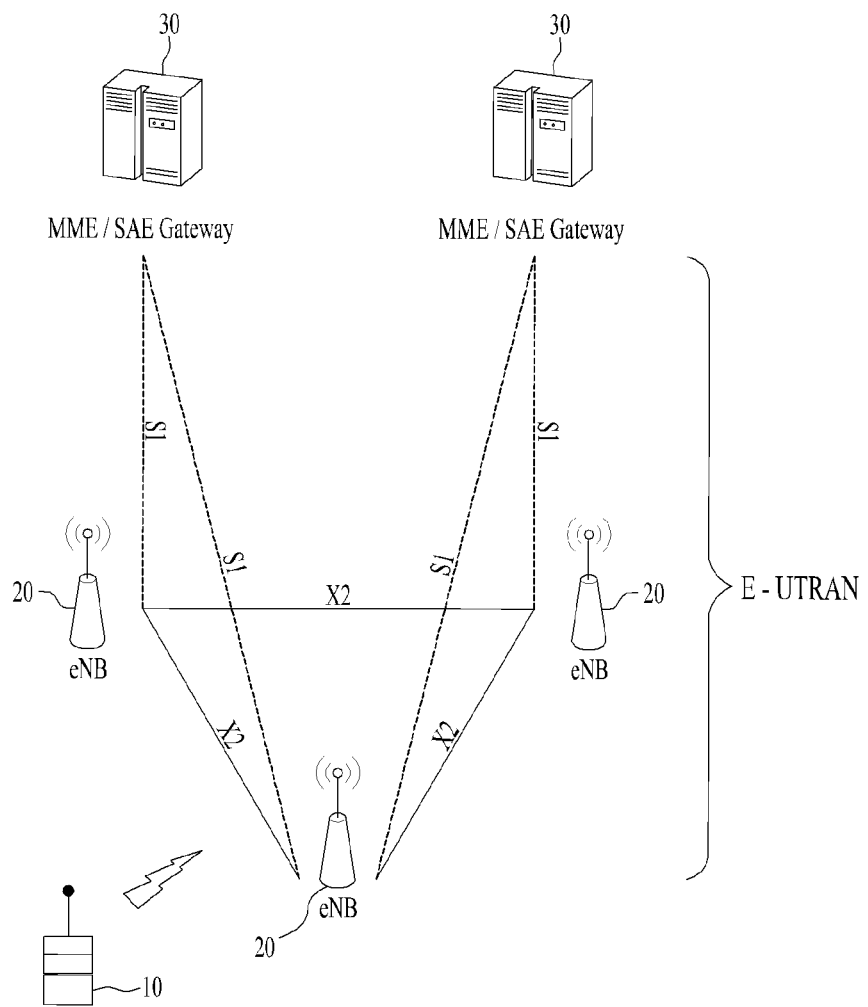
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
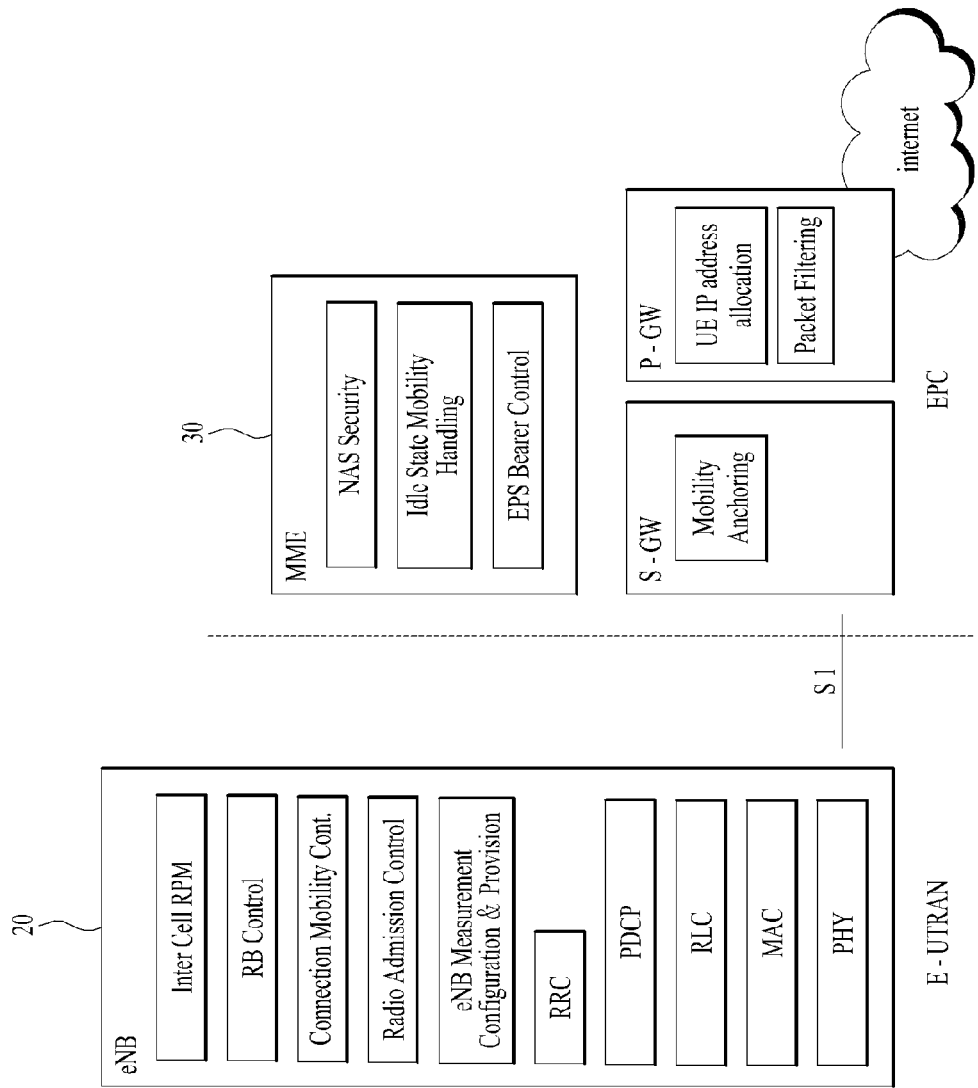
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

FIG. 2B is a block diagram depicting architecture of a typical E-UTRAN and a typical EPC. As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH)

information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
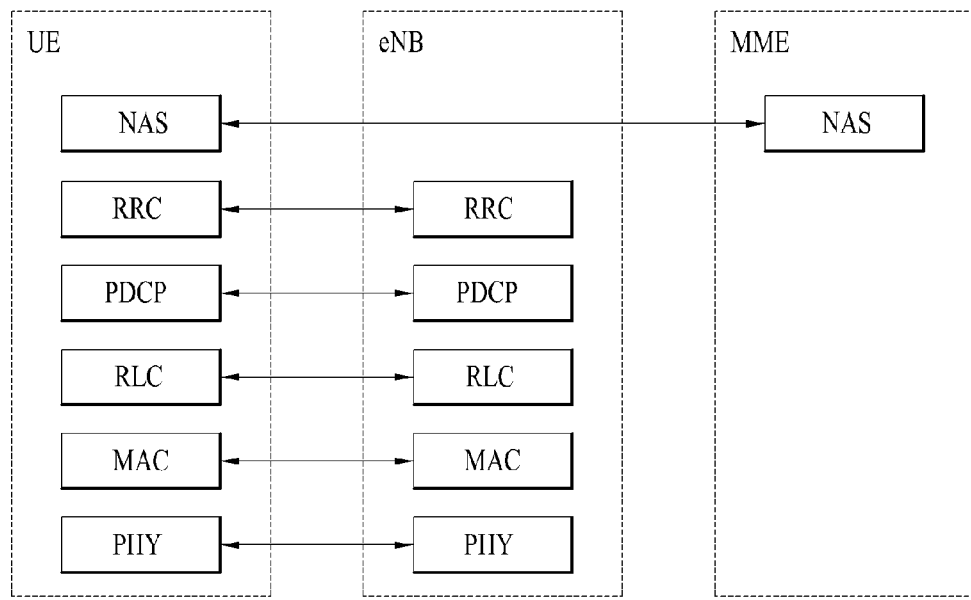
FIG. 3 is a diagram showing a control plane and a user plane of a radio interface protocol between a UE and an E-UTRAN based on a 3rd generation partnership project (3GPP) radio access network standard.
Figure 3:
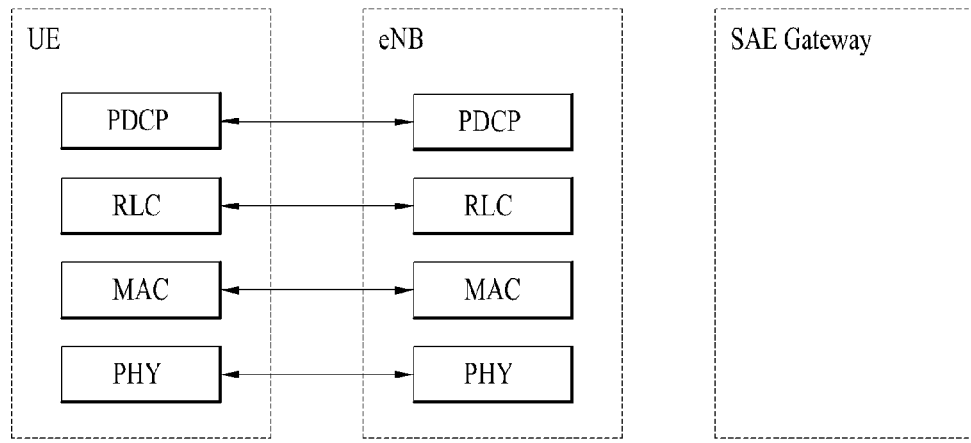

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
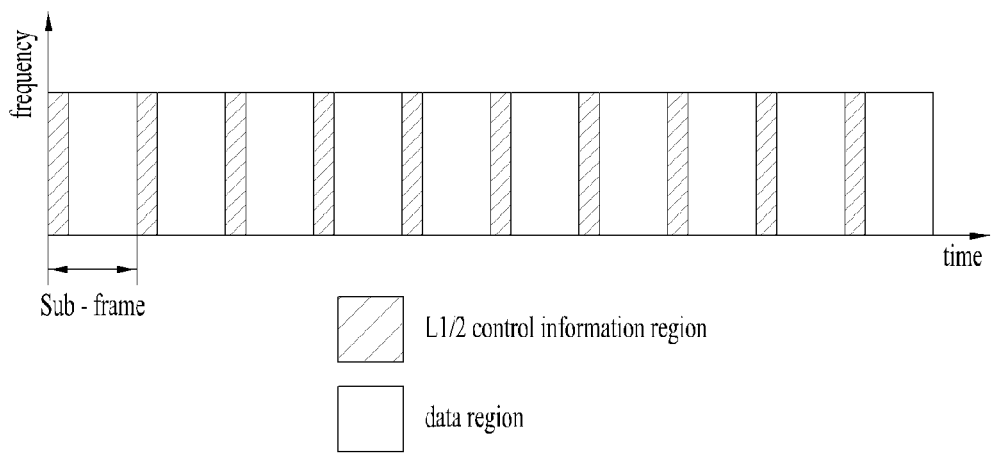
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
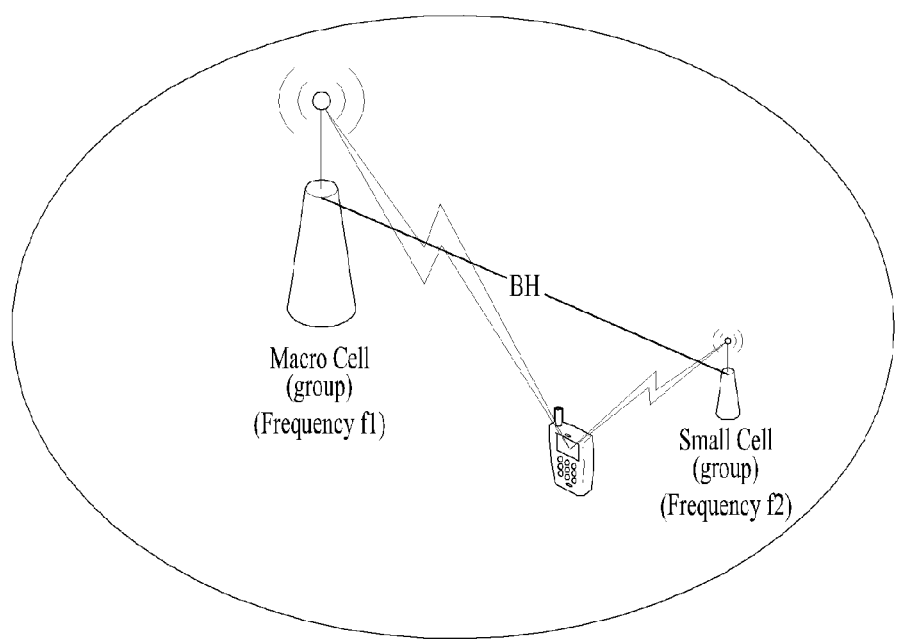
FIG. 5 is a conceptual diagram for dual connectivity between a macro cell and a small cell.

FIG. 5 is a conceptual diagram for dual connectivity between a macro cell and a small cell.

In the next system of LTE-A, a plurality of small cells (e.g, micro cell) may be present in a big cell (e.g. macro cell) having larger coverage than the small cells for optimization of data traffic, etc. For example, a macro cell and a micro cell may be combined for one user equipment (e.g. the dual connectivity). If the macro cell is used for managing mobility of the UE mainly (e.g. PCell) and the micro cell is used for boosting throughput mainly in this situation (e.g. SCell), the plurality of cells combined to the UE have different coverage each other. And each of cells can be managed by each of base stations. The base stations are geographically separated (inter-site CA).

The dual connectivity means that the UE can be connected to both the macro cell and the small cell at the same time. With dual connectivity, some of the data radio bearers (DRBs) can be offloaded to the small cell to provide high throughput while keeping scheduling radio bearers (SRBs) or other DRBs in the macro cell to reduce the handover possibility. The macro cell is operated by MeNB (Macro cell eNB) via the frequency of f1, and the small cell is operated by SeNB (Small cell eNB) via the frequency of f2. The frequency f1 and f2 may be equal. The backhaul interface between MeNB and SeNB is non-ideal, which means that there is considerable delay in the backhaul and therefore the centralized scheduling in one node is not possible.

To benefit from the dual connectivity, the best-effort traffic which is delay tolerant is offloaded to small cell while the other traffic, e.g SRBs or real-time traffic, is still serviced by the macro cell.

In a hetero network, small cells are deployed for the purpose of data offloading of the macro cell. When the UE finds itself in the proximity small cell, the UE may send a proximity indication to network (or a base station).

In case of small cells, there can be lot of cells that are relevant to UE, so there is increased memory overhead and processing overhead for the UE to maintain fingerprinting. If the UE performs autonomous search without fingerprinting information to find the small cell, power of the UE will be consumed significantly. Because the UE may perform autonomous search for not only small cell frequency layer but all capable frequencies.

Figure 6:
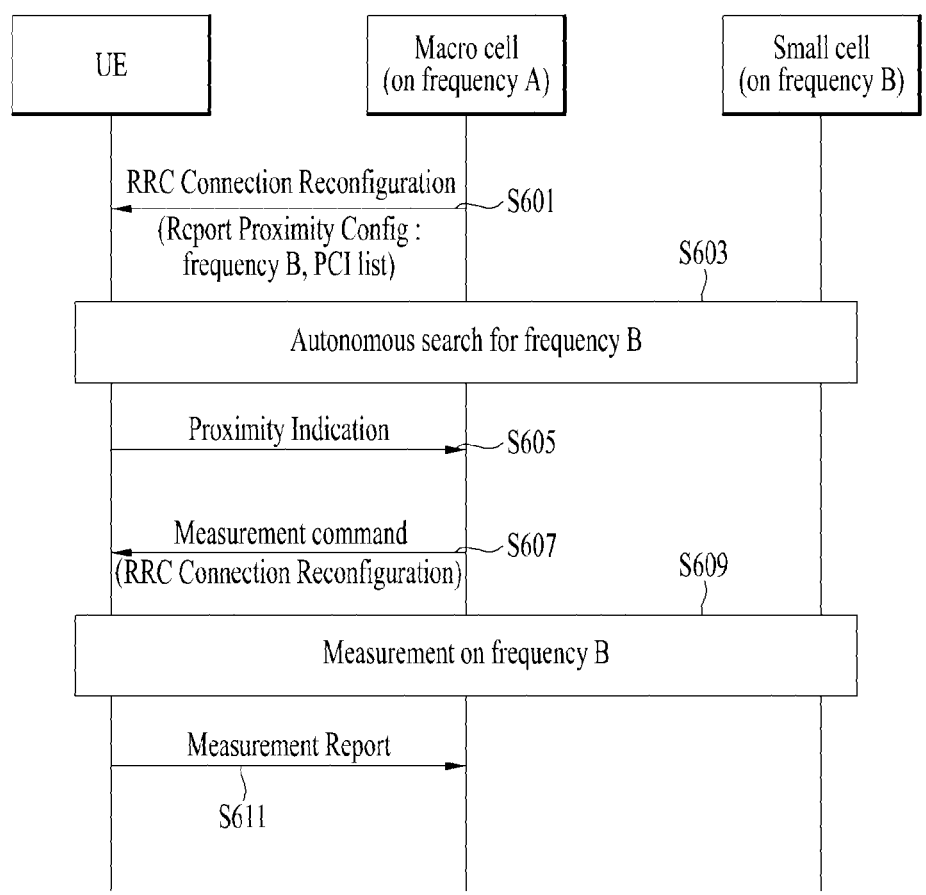
FIG. 6 is a conceptual diagram for autonomously performing search for a cell according to embodiments of the present invention.

FIG. 6 is a conceptual diagram for autonomously performing search for a cell according to embodiments of the present invention.

The UE received configuration information including frequency information (S601). The frequency information comprises one or more carrier frequency for the search and the frequency information further comprises PCI (Physical Cell ID) of corresponding cells. The step of S601 means that the BS orders the UE to perform autonomous search for a certain frequency indicated by the frequency information and find cells which has listed PCI.

The UE autonomously performs search for a cell in accordance with the frequency information when the UE received the configuration information (S603). That is the UE may perform autonomous search for not all capable frequencies but cell/frequency layer indicated by the frequency information.

Desirably, the cell may be one or more small cells located in the macro cell coverage. The small cell can be a cell having a smaller coverage than coverage of the macro cell (e.g., a pico-cell, CSG (Closed Subscriber Group) cell, a femto-cell, or small relay cell etc.) If the frequency information indicates frequency B, the UE starts performing autonomous search for frequency B.

In the step of S603, the UE may use autonomous search on the serving frequency. The UE shall disable the autonomous search function for small cells if the UE's PCI list is empty. The UE autonomous search function, per UE implementation, determines when and/or where to search for the small cells. If the UE detects one or more suitable cells on different frequencies, then the UE shall reselect to one of the detected cells irrespective of the frequency priority of the cell the UE is currently camped on, if the concerned small cell is the highest ranked cell on that frequency.

If the UE detects a suitable cell on the same frequency, it may reselect to this cell as per normal reselection rules. And if the UE detects one or more suitable small cells on another RAT (radio access technology), the UE shall reselect to one of them.

After the step of S603, the UE transmits a proximity indication about a detected cell when the cell is detected on a frequency identified by the frequency information (S605).

Desirably, the proximity indicator is transmitted only if the configuration information is received.

And then, the UE may a command for measurement for the cell (S607). The command for measurement may be transmitted via a RRCConnectionReconfiguration message. Upon receiving the RRCConnectionReconfiguration message, the UE may start performing measurement (S609). If the RRCConnectionReconfiguration message indicates frequency B, the UE starts performing measurement for frequency B.

After the step of S609, the UE transmits a measurement report including a result of the measurement (S611). If the measurement result of small cell on frequency B meets a MR triggering condition, the UE may send the measurement report message to the BS.

Figure 7:
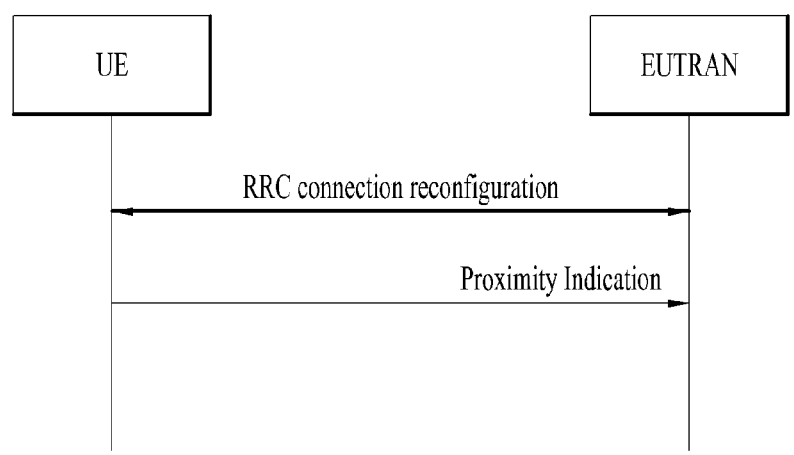
FIG. 7 is a conceptual diagram for proximity indication procedure according to embodiments of the present invention.

FIG. 7 is a conceptual diagram for proximity indication procedure according to embodiments of the present invention The proximity indication procedure is related to the step of S603. The purpose of this procedure is to indicate that the UE is entering or leaving the proximity of one or more small cells. The detection of proximity is based on an autonomous search function.

The UE in RRC_CONNECTED may initiate transmission of the ProximityIndication message when one of the following conditions is met.

The following condition comprises i) if the UE enters the proximity of one or more small cell(s) on an E-UTRA frequency while proximity indication is enabled for such E-UTRA cells; ii) if the UE enters the proximity of one or more small cell(s) on an UTRA frequency while proximity indication is enabled for such UTRA cells; iii) if the UE leaves the proximity of all small cell(s) on an E-UTRA frequency while proximity indication is enabled for such E-UTRA cells; or iv) if the UE leaves the proximity of all small cell(s) on an UTRA frequency while proximity indication is enabled for such UTRA cells, etc.

In case of iv) condition, the UE may initiate transmission of the ProximityIndication message only if the UE has previously not transmitted the ProximityIndication for the RAT and frequency during the current RRC connection, or if more than 5 s has elapsed since the UE has last transmitted a ProximityIndication (either entering or leaving) for the RAT and frequency.

In the conditions above, "if the UE enters the proximity of one or more small cell(s)" may include the case of already being in the proximity of such cell(s) at the time proximity indication for the corresponding RAT is enabled.

The UE may set the contents of ProximityIndication message as follows: i) set type to entering if the UE applies the procedure to report entering the proximity of small cell(s), ii) set type to leaving if the U E applies the procedure to report leaving the proximity of small cell(s), iii) set the carrierFreq to EUTRA with the value set to the E-ARFCN value of the E-UTRA cell(s) for which proximity indication was triggered if the proximity indication was triggered for one or more small cell(s) on an E-UTRA frequency, and iv) set the carrierFreq to ETRA with the value set to the ARFCN value of the UTRA cell(s) for which proximity indication was triggered if the proximity indication was triggered for one or more small cell(s) on a UTRA frequency.

The UE shall submit the ProximityIndication message to lower layers for transmission.

The proximityIndication message is transmitted via IE (information element) OtherConfig message.

For example, the IE OtherConfig may contain elements as following Table A.

TABLE A

```
-- ASN1START

OtherConfig-r9::= SEQUENCE+(
    reportProximityConfig-r9          ReportProximityConfig-r9      OPTIONAL,    -- Need ON
    ...,
    [[ Ido-Config-r11              IDO-Config-r11             OPTIONAL,    -- Need ON
        powerPrefIndicationConfig-r11   PowerPrefIndicationConfig-r11  OPTIONAL,    -- Need ON
        obtainLocationConfig-r11        obtainLocationConfig-r11       OPTIONAL,    -- Need ON
    ]]
}

IDC-Config-r11 ::=   Choice }
  release                          NULL,
  setup                            SEQUENCE (
    autonomousDenialParameters-r11          SEQUENCE (
      autonomousDenialSubframes-r11         ENUMERATED (n2, n5, n10, n15,
                                                        n20, n30, spare0, spare1),
      autonomousDenialValidity-r11          ENUMERATED (
                                                        sf200, sf500, sf1000, sf2000,
                                                        spare4, spare3, spare2, spare1)
    }                                         OPTIONAL,    --Need OR
    ...
  }
}

ObtainLocationConfig-r11 ::=  SEQUENCE (
    obtainLocation-r11        ENUMERATED (setup)          OPTIONAL,    --Need OR
)

PowerPrefIndicationConfig-r11 ::=   SEQUENCE (
    powerPrefIndication-Enabled-r11      ENUMERATED (enabled)      OPTIONAL,    --Need OR
    powerPrefIndication-Timer-r11        ENUMERATED (s0, s0dot5, s1, s2, s5, s10, s20,
                                                     s30, s80, s90, s120, s300, s800, spare3,
                                                     spare2, spare1)           OPTIONAL    -- Cond ppiENABLED
)

ReportProximityConfig-r9 ::=  SEQUENCE (
    proximityIndicationEUTRA-r9     ENUMERATED (enabled)     OPTIONAL,    --Need OR
    proximityIndicationUTRA-r9      ENUMERATED (enabled)     OPTIONAL,    --Need OR
)

-- ASN1STOP
```

Figure 8:
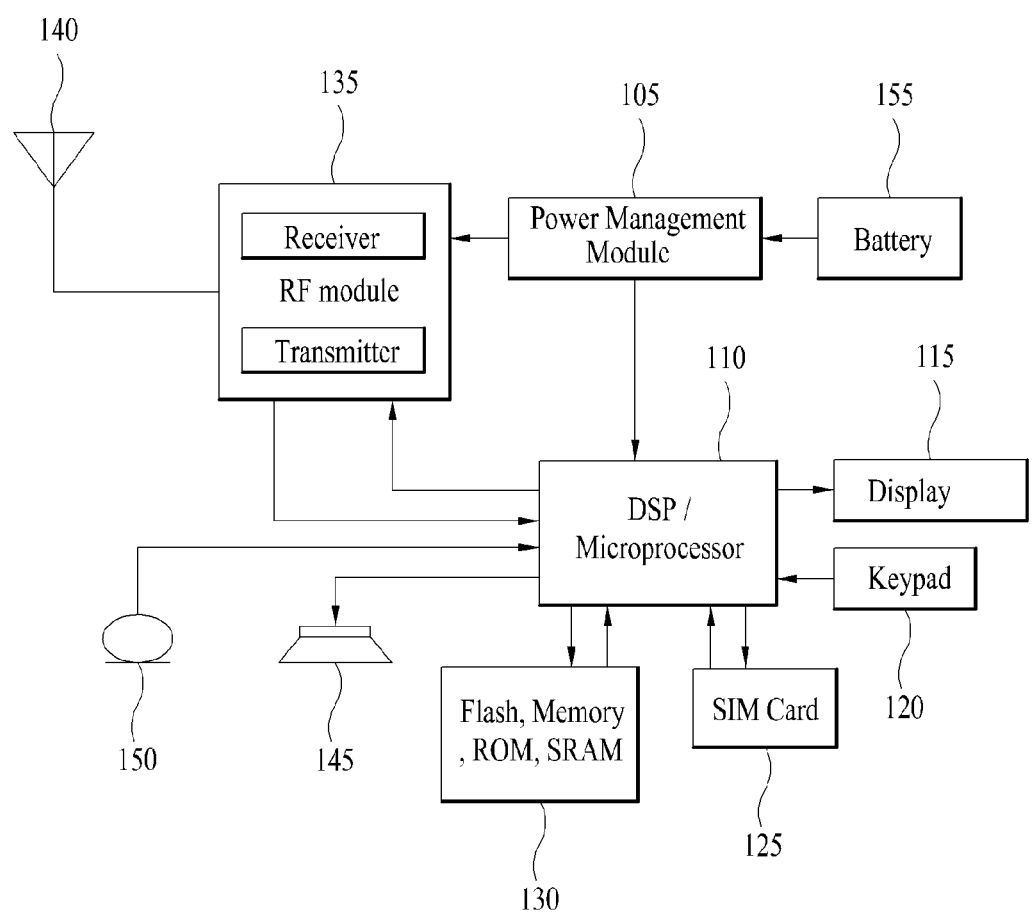
FIG. 8 is a block diagram of a communication apparatus according to an embodiment of the present invention.

FIG. 8 is a block diagram of a communication apparatus according to an embodiment of the present invention.

The apparatus shown in FIG. 8 can be a user equipment (UE) and/or eNB adapted to perform the above mechanism, but it can be any apparatus for performing the same operation.

As shown in FIG. 8, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 8 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 8 may represent a network apparatus comprising a transmitter (135) configured to transmit a request message to a UE and a receiver (135) configured to receive the transmission or reception timing information from the UE. These transmitter and receiver may constitutes the transceiver (135). The network further comprises a processor (110) connected to the transmitter and the receiver. This processor (110) may be configured to calculate a latency based on the transmission or reception timing information.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a user equipment (UE) operating in a wireless system, the method comprising:
   receiving configuration information including frequency information indicating a plurality of carrier frequencies;
   autonomously performing a search for a plurality of cells on each of the plurality of carrier frequencies in accordance with the frequency information;
   selecting a highest ranked cell among the searched plurality of cells regardless of a frequency priority among the plurality of carrier frequencies, wherein the highest ranked cell is a predetermined cell for each carrier frequency; and
   transmitting a proximity indication about the selected cell.

2. The method according to claim 1, wherein the proximity indication reports the selected cell without measured result.

3. The method according to claim 1, wherein the proximity indicator is transmitted only if the configuration information is received.

4. The method according to claim 1, wherein the frequency information further comprises PCI (Physical Cell ID) of corresponding cells.

5. The method according to claim 1, wherein the method further comprises;
   receiving command for measurement for the detected cell indicated by the proximity indication;
   performing the measurement for the detected cell; and
   transmitting a measurement report including a result of the measurement.

6. A user equipment (UE) in a wireless system, the UE comprising:
   a radio frequency (RF) module; and
   a processor controlling the RF module, the processor being configured to:
      receive configuration information including frequency information indicating a plurality of carrier frequencies,
      autonomously perform a search for a plurality of cells on each of the plurality of carrier frequencies in accordance with the frequency information,
      select a highest ranked cell among the searched plurality of cells regardless of a frequency priority among the plurality of carrier frequencies, wherein the highest ranked cell is a predetermined cell for each carrier frequency, and
      transmit a proximity indication about the selected cell.

7. The UE according to claim 6, wherein the proximity indication reports the selected cell without measured result.

8. The UE according to claim 6, wherein the processor transmits the proximity indicator only if the configuration information is received.

9. The UE according to claim 6, wherein the frequency information further comprises PCI (Physical Cell ID) of corresponding cells.

10. The UE according to claim 6, wherein the processor further configures to receive command for measurement for the detected cell indicated by the proximity indication, to perform the measurement for the detected cell, and to transmit a measurement report including a result of the measurement.

* * * * *